Oct. 27, 1942.                H. B. DENMAN                2,299,805
                                PACKING
                           Filed Dec. 26, 1941

Inventor:

Harry B. Denman,

Patented Oct. 27, 1942

2,299,805

UNITED STATES PATENT OFFICE 2,299,805

PACKING

Harry B. Denman, Detroit, Mich., assignor to Detroit Gasket & Manufacturing Company, Detroit, Mich., a corporation of Michigan Application December 26, 1941, Serial No. 424,513

1 Claim. (Cl. 288—34)

This invention relates to packing generally and more particularly to a material made up of layers of paper into a thickness of the order of thin paper board which is highly suitable for gasketing purposes in connection with automotive and airplane uses.

According to the invention, paper layers which are incompressible and also inextensible are formed into a flexible, resilient laminated structure by interposing between the layers a film of resilient material preferably of less thickness than the paper. This film not only bonds the layers together but more important, imparts substantial and permanent resiliency to the built-up product as a whole. Of particular importance, the resilient built-up product is inextensible under high sealing compression, i. e., does not squeeze out or flow when clamped between the sealing flanges of a joint.

The principal object of the invention is to provide a flexible laminated gasket formed of thin but inextensible and incompressible paper layers and possessed of permanent properties of resiliency and inextensibility under high sealing pressures.

Another object of the invention is to provide a gasket structure of the character described which will withstand, without distortion, severe external or bolt pressures and internal pressures occasioned by the presence of oil or water and, which moreover, due to its permanent characteristics, can be drawn down to definite predetermined positions.

An equally important object with the foregoing is to provide a packing which retains its resiliency in storage and will have enhanced life when compressed between the flanges of a joint to form a seal. That is to say, the gasket of the present invention has the resilient film interposed between and protected by the paper layers. This is a marked improvement because gaskets made from this packing material do not solely depend for their sealing efficiency upon the provision of surface coatings which latter sometimes deteriorate in storage or under compression due to abrasion or the effects of temperature and chemical action.

Referring to the accompanying drawing.

Figure 1:
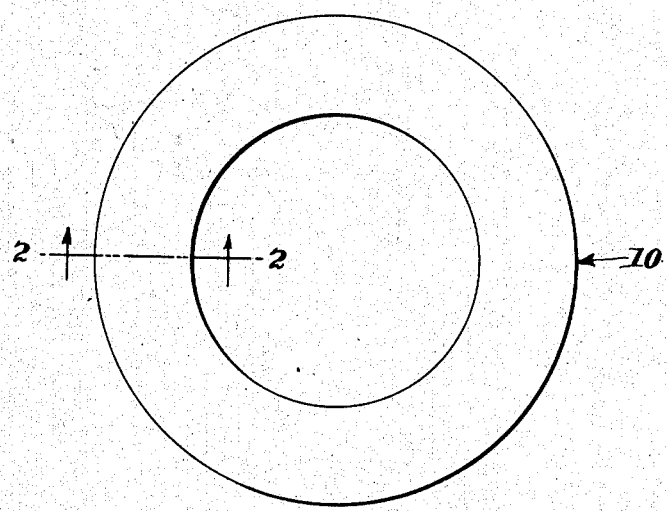
Figure 1 is a plan view illustrating one form of gasket.

The gasket 10 shown in Figure 1 may take any other form necessary to produce a tight seal and I have shown a circular or ring gasket solely by way of example.

Figure 2:
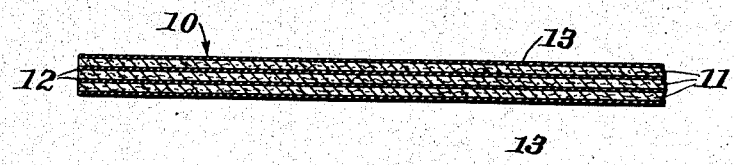
Figure 2 is a sectional view on the line 2—2 of Figure 1.

Referring to Figure 2, the paper layers 11 have a thickness of the order of .005" and are formed of various furnishes. In some instances, the layers 11 may be made from a furnish in which is incorporated phenol formaldehyde resin, urea formaldehyde resin or other synthetic resins, or the paper may be impregnated with such resins. The presence of synthetic resins does not chemically change the paper but does impart thereto the desirable characteristics of strength and inextensibility without objectionably impairing flexibility. At the same time, such resins will be resistant to and render the paper resistant to water, oils, solvents and elevated or reduced temperatures, i. e., resistant to such chemical action and temperature conditions as the gasket will encounter in use. In some cases, the paper layers may be of "vulcanized fibre" either of the zinc chloride or sulphuric acid types. The paper, as will be appreciated, is incompressible.

I have found that thin flexible layers of paper characterized by inextensibility under compression but having little or no compressibility can be laminated into a permanently resilient inextensible gasket. Referring to Figure 2, the packing is formed as a built-up structure having a thickness of the order of thin paperboard by interposing between the paper layers a film of resilient material 12. This material binds the paper layers together and imparts permanent resiliency and flexibility to the laminated structure as a whole. As shown, the resilient films are preferably of less thickness than the paper, namely, of the order of .0015". A built-up packing of this character, besides having permanent resilience has the further important advantage of being inextensible, i. e., the packing does not squeeze or flow out between the joint surfaces under high sealing compression.

The resilient material 12 will have resistance to water, oils and solvents as well as high and reduced temperatures according to the requirements for which the packing is to be used and in some cases may be thermosetting. Thus, the resilient film may be made of "Neoprene," "Thiokol," rubber or rubber latex or cements including the same, cellulose acetate, resins such as vinyl acetate and flexible glues.

The surfaces of the gasket are provided with a sealing coating 13 which may be of a material similar to the material 12 or a different material as well understood in the art for aiding in forming a tight seal between the gasket surfaces and the surfaces of the flanges of the joint.

In making the gasket, the paper layers may be coated in any suitable manner with a film of the adhesive, resilient material in spreadable form, preferably as a solution. Brushing or spraying may be employed, but preferably the paper is drawn through a suitable bath containing the resilient, adhesive film material so that great lengths of paper may be continuously coated. Thereafter, the coated paper layers are built-up as shown in Figure 2, to the required thickness. The laminated structure is then compressed under a pressure of the order of 500 pounds per square foot to form the integrally bonded structure i. e., the layers are subjected to sufficient pressure to produce a substantially homogeneous structure. In some cases, heat is employed in addition to the pressure for driving off the solvent and in the case of thermosetting materials, for setting the same. From the laminated sheet or strip of packing so produced, gaskets 10 of various shapes and sizes may be readily stamped.

While I have illustrated in the drawing a packing having three paper layers, it is to be understood that a packing having from two paper layers up to an indefinite number of such layers may be formed depending upon the gasketing conditions which are to be met.

The sheets or strips of laminated packing as well as the gaskets formed therefrom have an enhanced life both in storage and under compression because the intermediate resilient films 12 are always protected by the paper layers. Notwithstanding that the surface films 13 may deteriorate in storage or lose their efficiency due to abrasion through contact with the flange surfaces of the joint, the gasket will form a tight seal at all times because of its permanent properties of compressibility, inextensibility, and flexibility. That is to say, the gasket is not dependent for its efficiency solely upon the surface films 13 which are employed for their well known purpose, since a permanent resiliency is imparted by the interposed and constantly protected resilient films 12.

Gaskets made in accordance with the present invention are highly useful to take care of sealing requirements demanding a high degree of precision because the packing is not only resistant to high external pressures such as bolt pressures but high internal pressures occasioned by the presence of water or oil as well. Moreover, the packing can be drawn down to reliably meet the most delicate or critical sealing conditions. In other words, the packing formed as described herein is a highly compressed, resilient, laminated and stable structure having a thickness of the order of thin paperboard which will meet the most exacting requirements of the automotive and airplane industry.

It is a significant feature of this invention that the intermediate films 12 are formed from a material of such a character and which is present in such amount that it does not exude from between the paper layers under the forming pressure or under the sealing pressure to which the gasket is subjected in use. That is to say, the sealing material cooperates with the inextensible layers to the end that it is effective to promote inextensibility while at the same time impart flexibility and permanent compressibility. The resilient films 12 also act to protect the paper layers against chemical action and temperature conditions and do not swell or deteriorate in the presence of these influences.

I claim:

Flexible packing being a highly compressed laminated flexible structure having a thickness of the order of thin paper-board comprising layers of flexible substantially inextensible and incompressible paper, and layers of resilient, flexible, compressible, adhesive material interposed between the paper layers and of less thickness than the paper layers, said layers being subjected to sufficient pressure to produce a substantially homogeneous structure, said resilient, compressible, adhesive layers binding the paper layers together and rendering the structure as a whole permanently resilient and compressible under bolt pressure without rendering the built-up structure extensible so that it does not squeeze out under internal and external pressures, the resilient adhesive being present in amount as not to exude under high sealing pressure or destroy the flexibility of the built-up structure, said paper layers protecting the resilient binding layers, whereby the resiliency and inextensibility of the composite structure is permanently assured in the presence of high pressures, water, oils, solvents and temperature variations and is not dependent on surface coatings.

HARRY B. DENMAN.